Figure 1:
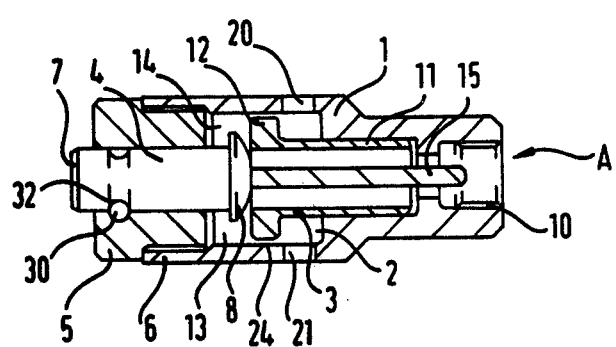

United States Patent [19]

Stevens et al.

[11] 4,151,863

[45] May 1, 1979

[54] DEFLATION DEVICE

[75] Inventors: John A. Stevens, Nuneaton; Philip H. Pegram, Leamington Spa, both of England

[73] Assignee: Dunlop Limited, London, England

[21] Appl. No.: 733,880

[22] Filed: Oct. 19, 1976

[30] Foreign Application Priority Data

Oct. 25, 1975 [GB] United Kingdom .............. 43977/75

[51] Int. Cl.² ............................................. F16K 15/20
[52] U.S. Cl. ..................................... 137/798; 137/230; 137/464
[58] Field of Search ................. 137/230, 464, 466, 798

[56] References Cited

U.S. PATENT DOCUMENTS

| 837,772 | 12/1906 | Arnold | 137/230 |
| 2,508,186 | 5/1950 | Newell | 137/464 |
| 3,087,508 | 4/1963 | McCollum | 137/466 |

*Primary Examiner*—Harold W. Weakley
*Attorney, Agent, or Firm*—Stevens, Davis, Miller & Mosher

[57] ABSTRACT

A device is provided which can be screwed onto the adaptor of the valve assembly of a pneumatic tire and a plunger depressed to commence tire deflation. A pressure sensitive member responds to a drop in the pressure of the emerging air to allow the valve to close when a predetermined low pressure remains in the tire.

3 Claims, 2 Drawing Figures

DEFLATION DEVICE

This invention relates to improvements in or relating to valve assemblies and in particular to tire inflation valve assemblies.

Operators who handle large tire and wheel assemblies, particularly aircraft tires which are inflated to very high pressures such as 150 to 200 lbf/in$^2$, have complained of the dangers in handling such tire and wheel assemblies. Aircraft ground-crew have to transport tire and wheel assemblies and fit them to aircraft during maintenance. It is considered that the high pressures within the tires constitute a potential menace to such operators.

It is considered that the best way to handle such tire and wheel assemblies is to deflate the tire to a low pressure of about 30 to 50 lbf/in$^2$, which pressure maintains substantially the profile of the tire and keeps the beads of the tire on their associated bead seats, whilst at the same time reduces the chance of explosion due to the high pressure within the assembly. To deflate the tire totally makes it loose on the rim and awkward to carry and also introduces the danger of explosion, always present in reinflating such an assembly, because the beads tend to wander from the bead seats when the tire is deflated.

Operators wish to have a device which can be fitted to the inflation valve of a tire and wheel assembly to enable the tire to be deflated to a predetermined low pressure. It is desirable that the deflation can be carried out automatically so that the operator can leave the tire to deflate to the desired pressure.

According to the present invention there is provided a device for the automatic deflation of a pneumatic tire to a predetermined, reduced pressure, the device comprising a housing adapted to be connected to the inflation valve of the tire, a plunger within the housing manually displaceable to open the valve when the housing is connected thereto and a passageway in the housing for air escaping from the opened valve, which passageway has a restricted opening to atmosphere and a chamber upstream of said opening which will be pressurized by air escaping from the valve through the opening, pressure-sensitive means being provided in the chamber adapted to urge the plunger in the valve-opening direction so long as air pressure in the chamber remains above a predetermined value and adapted to be overcome by the biassing means of the valve to allow the valve to close when air pressure in said chamber falls below said predetermined value.

Preferably the pressure sensitive means comprises a piston bounding one side of the chamber and integral with the plunger, the effective area of the piston and the dimensions of the restricted opening being so chosen that when pressure in the chamber falls below said predetermined value the force acting against the piston will be less than the return force exerted by the valve biassing means.

The plunger preferably comprises separate piston and button portions slidable in the housing in coaxial relation, the button portion being accessible from outside the housing initially to depress the plunger to open the valve.

Figure 2:
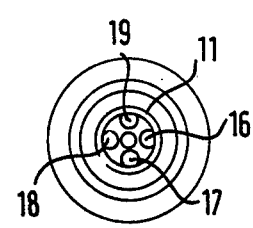

One embodiment of the present invention will now be described by way of example only with reference to the accompanying drawings in which:

FIG. 1 is a cross-sectional view of a device which may be attached to the inflation valve of an associated tire, and FIG. 2 is an end-on view of the device when viewed along the direction of the arrow A of FIG. 1.

A device which may be attached to a conventional inflation valve of a tire to enable it to be automatically deflated to a predetermined pressure comprises, as shown in FIG. 1, a substantially cylindrical housing 1 having an axially extending stepped throughway 2 provided therein. A piston 3 is located within the throughway 2 to be slidable therein and is displaceable by a button 4 which is axially slidable within an end cap 5 which in turn screws into an internally threaded end portion 6 of the housing 1. One end 7 of the button 4 is arranged to extend externally of the end cap and housing. The other end of the button is provided with a curved abutment face 8 which is arranged to engage the piston 3. The end 10 of the housing 1 opposite the end cap 5 is internally threaded so that the device can be screwed directly onto the externally threaded adaptor of a conventional tire inflation valve assembly.

The piston 3 comprises a cylindrical body portion 11 which is a sliding fit within part of the throughway 2 of the housing. The end of the piston 3 which abuts the button 4 is provided with a portion of enlarged cross-section 12 which extends into a wider part 13 of the throughway 2. The enlarged end portion 12 forms the face of the piston and defines with the housing and the end cap 5 a cylindrical chamber 14. The opposite end of the piston 3 is provided with an axially extending spindle 15 which is arranged to extend into the threaded end 10 of the housing so that when the device is screwed onto an inflation valve, the spindle can be made to displace the stem of the valve (not shown) by manually depressing the exposed end 7 of the button 4.

As shown in FIG. 2 the body portion 11 of the piston 3 is provided with four equally spaced longitudinally extending cylindrical passages 16 to 19. The passages 16 to 19 extend along the length of the piston 3 as shown in FIG. 1 to allow passage of air from the valve to the chamber 14.

The wall of the throughway 2 adjacent the wider part 13 is provided with a plurality of exit holes two of which 20 and 21 are shown in FIG. 1, which allow air to escape from the device to atmosphere.

As shown in FIG. 1, the air which is expelled from the tire (not shown) when the button 4 is depressed passes along the body portion 11 of the piston 3 and into the chamber 14 past the end portion 12 of the piston 3 and through a small annulus 24 defined between the end portion 12 and the wall of the housing. On passing through this restricted orifice, the air is exhausted to atmosphere via the exit holes 20 and 21. The restricted orifice 24 defined around the enlarged end portion 12 of the piston 3 is arranged such that air is released at a sufficiently large rate to enable the tire to be speedily deflated, but at the same time the flow of air is restricted sufficiently to ensure a build-up of pressure within the chamber 14.

To operate the device, the device is screwed onto the inflation valve of the tire and the button 4 is pressed inwardly to urge the piston 3 and associated spindle 15 to depress the valve stem (not shown) to allow release of air from the tire. The air rushes from the tire inflation valve along the passages 16 to 19 of the piston body member 11 and into the chamber 14. The air in the chamber 14 causes a build-up of pressure which acts against the enlarged end 12 of the piston to urge the piston against the tire valve and thereby keep the stem of the valve depressed even though the button 4 has been released. While the piston member is in the activated position, air escapes from chamber 14 past the restricted orifice 24 and to atmosphere via the exit holes 20 and 21. The conventional inflation valve has a spring (not shown) which urges the stem of the valve outwardly to seal the valve. The device is designed so that the spring force only urges the valve to the closed position against the pressure in the chamber 14 when the tire has been deflated to the desired pressure of about 30 to 50 lbf/in$^2$. Calibration of the device therefore depends on the cross-sectional area of the end portion 12 of the piston and the size of the restricted orifice 24.

In a further alternative, the restricted orifice 24 which is formed by an annulus between the enlarged end portion 12 of the piston and the wall of the housing can be replaced by an orifice in the wall of the housing adjacent the chamber 14.

In this case the piston would be a much closer fit within the wider part 13 of the throughway and the air would escape through the orifice in the wall of the housing.

If an operator wishes to use the device to completely deflate the tire, he can secure the button 4 in the depressed position to release air from the tire by inserting a pin 30 into a correspondingly profiled aperture provided in the end cap 5 so that a portion of the pin 30 locates within a recess 32 formed on the outer surface of the button 4 and thereby prevents the button moving outwardly relative to the device.

A device of the kind disclosed above has the advantage that perfect sealing surfaces are not required in any of the moving components; the inflation valve seal is the only 100% seal that is required. The device will work quite satisfactorily if air does escape between the exterior of the piston body portion 11 and the throughway 2 and also between the button 4 and the end cap 5, with the proviso that this loss of air is not too great to prevent sufficient build-up of pressure within the chamber 14. This advantage enables the parts to be made simply and cheaply without necessitating high tolerancing of the throughway and interfitting parts. The device could be made of a moulded plastics material or machined aluminium and could be produced in large numbers moderately cheaply.

In a further alternative the piston 3 and button 4 could be integral as a single plunger means to open the inflation valve.

Having now described our invention, what we claim is:

1. A device for use in conjunction with an inflation valve including valve closing biasing means of a pneumatic tire for automatically deflating said tire to a predetermined above atmospheric reduced pressure level comprising:

a housing including an internally threaded end portion adapted to be connected to external threads on said inflation valve, a displaceable plunger assembly mounted within said housing and having a first manually operable portion which projects outside said housing and a second portion which is adapted to operatively engage with and open said inflation valve against the force of said biasing means associated therewith when said housing is connected to said inflation valve and an exterior force is applied to said first manually operable portion to move said plunger assembly in an inflation valve opening direction, a passage within said plunger assembly for allowing air entering said internally threaded end portion to pass therethrough, a pressure chamber receiving said air exiting from said passage, said chamber being defined by a portion of the interior of said housing and by a surface integral with said plunger assembly, said chamber including a continuously open restricted air passageway communicating with the atmosphere, said plunger assembly surface being sensitive to air pressure in said chamber for urging said plunger assembly in an inflation valve opening direction as long as air pressure within said chamber remains above a predetermined value and for allowing said plunger to be urged in an inflation valve closing direction by said inflation valve biasing means when said housing is connected to said inflation valve and air pressure in said chamber falls below said predetermined value, the dimensions of said restricted air passageway and said integral plunger assmebly surface being such that said predetermined value of air pressure which allows said biasing means to close said inflation valve corresponds to said predetermined above atmospheric reduced pressure level.

2. A device as claimed in claim 1 wherein said plunger comprises separate piston and button portions slidable in said housing in coaxial relation, said button portion being accessible from outside said housing initially to depress said plunger in an inflation valve opening direction.

3. The combination as claimed in claim 1, wherein a locking mechanism is provided which is adapted to prevent the biasing means of said tire valve from urging said plunger in an inflation valve closing direction when said air pressure in said chamber falls below said predetermined value.

* * * * *